Patented Aug. 17, 1954

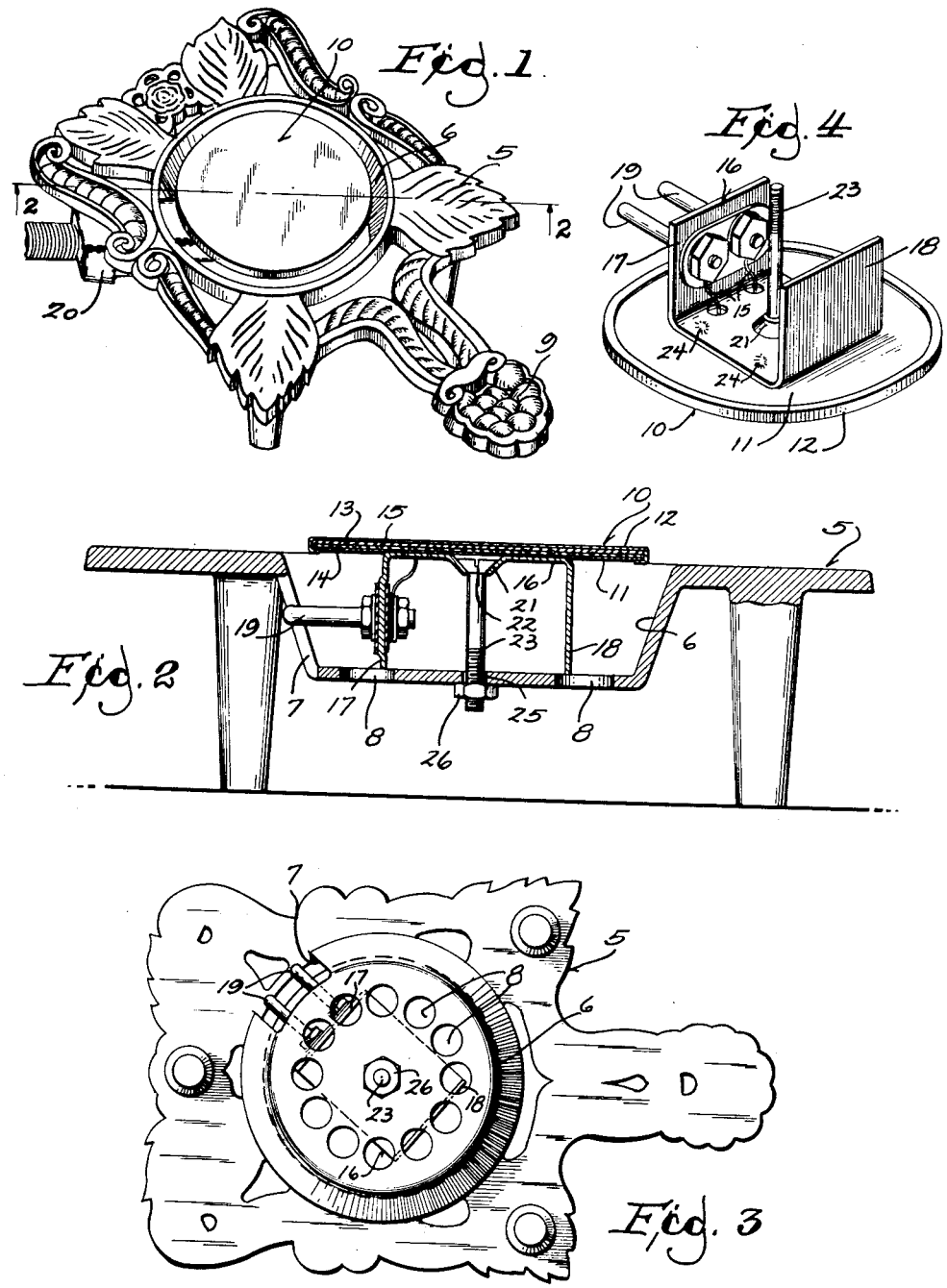

2,686,862

UNITED STATES PATENT OFFICE 2,686,862

TRIVET HOT PLATE

David Morrison, Two Rivers, and Jurg A. Senn, Manitowoc, Wis., assignors to Paragon Electric Company, Two Rivers, Wis., a corporation of Wisconsin Application August 24, 1953, Serial No. 376,102

7 Claims. (Cl. 219—37)

This invention relates to a trivet hot plate.

In the past, trivets have been used solely for the support of previously heated vessels. In the instant device, the trivet not only protects the underlying table surface from the heat, but incorporates a heating element which may either keep food or drink at an appropriate temperature or may be used to effect its initial heating thereof.

The use of a trivet as a support for a heating element involves problems due to the undesirability of using any thermal insulation in the handle, which is an ornamental part of the trivet. The present invention seeks to incorporate the heating of the element in the trivet in such a manner as to elongate metallic paths of heat conduction between the heating element and the trivet and to reduce the cross section of metal and to provide convection cooling for the metal inset pads to the end that undue heating of the trivet and its handle will not occur.

To accomplish these objects, the trivet is provided with an integrally cast well in an intermediate portion, the side wall of which is apertured to receive the electrical receptacle and the bottom of which is apertured to provide for air circulation.

Upon the apertured bottom is fastened a simple metal support having legs of sheet metal which span the apertured portion of the bottom to provide a stable but attenuated metallic contact therewith. One of the legs also serves to support the prongs to which the receptacle in the end of the extension are connected. The support is spot welded to the under surface of the heating element, which confines the head of a single anchoring bolt having a nut engaged beneath the bottom of the trivet well to serve as the only means of fastening the heating element in place.

The support holds the heating element slightly above the surface of the trivet so that any receptacle placed thereon will be free of the trivet, not only avoiding heat conduction through the vessel to the trivet, but providing clearance through which air may circulate by convection to carry off heat from the portion of the trivet beneath the element.

In the drawings:

Fig. 1 is a view in perspective of a device embodying the invention.

Fig. 2 is an enlarged detail view taken in cross section on line 2—2 of Fig. 1.

Fig. 3 is a bottom plan view of the device.

Fig. 4 is a detail view in perspective of the inverted heating element and its support.

The trivet 5 is of generally conventional construction except that, at an intermediate point between its three legs, it is provided with an integral well at 6 with a large opening 7 in its side wall and an annular series of smaller openings at 8 in its bottom. The trivet has the usual handle 9.

The heating element 10 comprises a bottom disk 11 and a top plate 12, the margins of which are formed inwardly beneath disk 11. The two disks have sandwiched between them disks 13, 14 of mica or similar disk of dielectric between which the electrical resistance wire 15 is sandwiched.

The support 16 is made of sheet metal in the form of an inverted U, having legs 17 and 18 engaged at their free ends with the bottom of the well portion 6 of the trivet. Desirably, these legs span the apertures in the trivet bottom as shown in Fig. 3 where they have great stability without a great deal of metal to metal contact. The leg 17 supports prongs 19 to which the extension cord receptacle 20 may be connected in the usual manner through the opening 7 in the side wall of the trivet well 6. The support 16 has apertures which connect with corresponding apertures in the lower plate 11 of the heating element through which the terminal ends of the resistor 15 are led to connect with the connective prongs 19 as shown in Fig. 4.

The support 16 is centrally apertured and downwardly embossed at 21 to receive the head 22 of an anchor bolt 23. The support is connected by spot welding or otherwise to the bottom disk 11 of the heating element, desirably before such disk is assembled in the heating element. By way of example, spot welding is shown at 24. The connection of the support 16 and disk 11 anchors the head 22 of bolt 23 so that the bolt remains a unitary part of the assembly of the heating element and support. The trivet well 6 has a central aperture at 25 through which the bolt 23 projects. The nut 26 on the bolt engages the under surface of the bottom wall of well 6 to anchor to the trivet the unit which comprises the heating element and its support.

It will be observed that the legs 17 and 18 are of such length that the top surface of the heating element is materially above the level of the trivet. Consequently, any utensil positioned on the heating element to receive heat therefrom will be free of contact with the trivet proper, thereby avoiding heat conduction through the bottom of the utensil to the trivet. Additionally, however, the clearance provides for air circulation, thus encouraging convection of currents of air to move upwardly through the apertures 7 and 8 in the trivet well to carry from the trivet well to the sides of the vessel any heat which might otherwise be conducted through the trivet well to the trivet and its handle.

We claim:

1. An electric heating device including a depressed well formed integrally with said device, a plurality of circularly distributed apertures provided in the well bottom, a heating unit including a top and bottom plate and electric heating means enclosed therebetween, means for securing said heating unit substantially centrally thereof at only one point in said well bottom, and substantially U-shaped, sheet metal supporting means fastened to said bottom plate and including leg portions extending from said heating unit towards said well bottom, said leg portions lying substantially along the same radius as said circularly spaced apertures and resting on said bottom adjacent to and bridging at least some of said apertures, said heating unit being free of contact with said device except at said securing means and said supporting means, whereby the heat transfer between said heating unit and said device is minimized.

2. An electric heating device including a depressed well, a handle and legs cast integrally with said device, a plurality of apertures provided in the well bottom, a heating unit including a top plate, a bottom plate and an electric heating element enclosed therebetween, bolt means for securing said heating unit substantially centrally thereof at only one point in said well bottom, and substantially U-shaped supporting means formed of relatively thin sheet metal welded to said bottom plate and including leg portions extending from said heating unit towards said well bottom and resting thereon adjacent to and bridging at least some of said apertures, said heating unit being spaced on all sides thereof from said device and thereby being free of contact with said device except at said bolt means and said supporting means, whereby the heat transfer between said heating unit and said device is greatly reduced.

3. The combination according to claim 2 wherein one of said leg portions includes terminals to which said heating element is secured with the ends thereof.

4. A trivet including a depressed well formed integrally with said trivet, a plurality of circularly spaced apertures provided in the well bottom, a heating unit including a top plate, a bottom plate and heating means therebetween, means for securing said heating unit at only one point in said well bottom, and supporting means of sheet metal material fastened to said bottom plate and including leg portions extending from said heating unit toward said well bottom, said leg portions lying substantially along the same radius as said circularly spaced apertures and resting on said bottom adjacent to and bridging at least some of said apertures, said securing means and said supporting means being of such height as to dispose said heating unit with its upward surface of said top plate slightly above the surface of said trivet, said heating unit being spaced from said trivet on all sides thereof and thereby being free of contact with said trivet except at said securing means and said supporting means, whereby the heat transfer between said heating unit and said trivet is minimized.

5. A trivet including a depressed well cast integrally with said trivet, a plurality of circularly distributed apertures provided in the well bottom, a heating unit, bolt means for securing said heating unit substantially centrally thereof at only one point in said well bottom, and supporting means including leg portions made of relatively thin sheet metal material extending from said heating unit towards said well bottom, said leg portions lying approximately along the same radius as said circularly distributed apertures and resting with the lower edges thereof on said bottom adjacent to and bridging at least some of said apertures, said bolt means and said supporting means being of such height as to dispose said heating unit with its upward surface slightly above the surface of said trivet, said heating unit being free of contact with said trivet except at said securing means and said supporting means, whereby the heat transfer between said heating unit and said trivet is minimized.

6. A trivet including a depressed well formed integrally with said trivet, a plurality of apertures provided in the well bottom, heating unit including a top and bottom plate and electric heating means enclosed therebetween, means for securing said heating unit substantially centrally thereof at only one point in said well bottom, and substantially U-shaped, sheet metal supporting means fastened to said bottom plate and including leg portions extending from said heating unit toward said well bottom and resting thereon adjacent to and bridging at least some of said apertures, said securing means and said supporting means being of such height as to dispose said heating unit with its upward surface of said top plate slightly above the surface of said trivet, said heating unit being free of contact with said trivet except at said securing means and said supporting means, whereby the heat transfer between said heating unit and said trivet is minimized.

7. A trivet including a depressed well, a handle and legs cast integrally with said trivet, a plurality of apertures provided in the well bottom, a heating unit including a top plate, a bottom plate and an electric heating element enclosed therebetween, bolt means for securing said heating unit substantially centrally thereof at only one point in said well bottom, and substantially U-shaped supporting means formed of relatively thin sheet metal welded to said bottom plate and including leg portions extending from said heating unit toward said well bottom and resting thereon adjacent to and bridging at least some of said apertures, said bolt means and said supporting means being of such height as to dispose said heating unit with its upward surface of said top plate slightly above the surface of said trivet, said heating unit being spaced on all sides thereof from said trivet and thereby being free of contact with said trivet except at said bolt means and said supporting means, whereby the heat transfer between said heating unit and said trivet is greatly reduced.

References Cited in the file of this patent

UNITED STATES PATENTS

| Number | Name | Date |
|---|---|---|
| 1,533,175 | Fahrenwald | Apr. 14, 1925 |
| 1,697,175 | Forshee | Jan. 1, 1929 |
| 2,133,508 | Gundelfinger | Oct. 18, 1938 |
| 2,176,382 | Smith | Oct. 17, 1939 |
| 2,290,901 | Weinhardt et al. | July 28, 1942 |
| 2,470,715 | Olivares | May 17, 1949 |
| 2,494,447 | Mosthaf | Jan. 10, 1950 |
| 2,496,654 | Alsdorf | Feb. 7, 1950 |
| 2,580,698 | Perlman | Jan. 1, 1952 |